No. 782,989. PATENTED FEB. 21, 1905.
H. RODMAN.
ELECTROLYTIC PRODUCTION OF SUPEROXIDS IN ALKALINE SOLUTIONS.
APPLICATION FILED MAY 17, 1902.
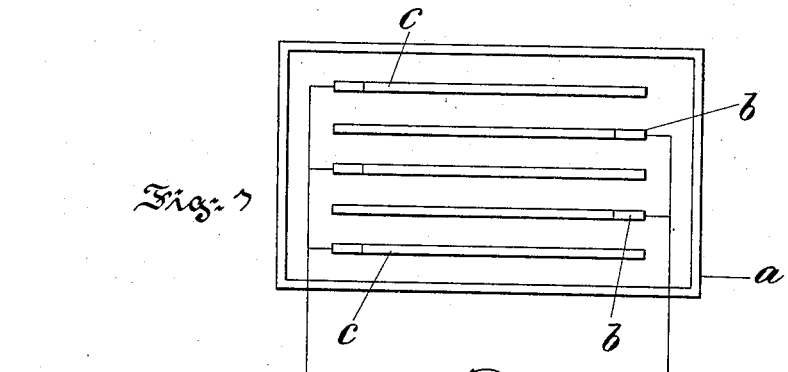
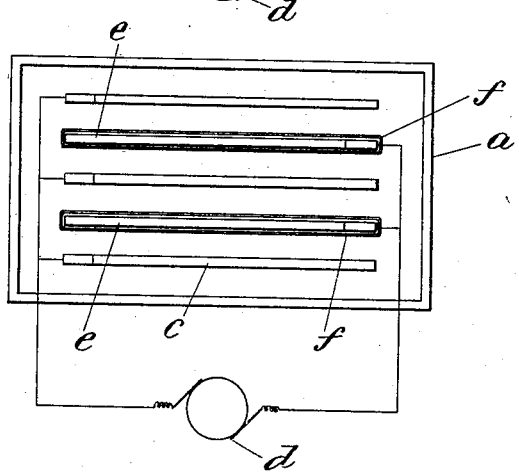
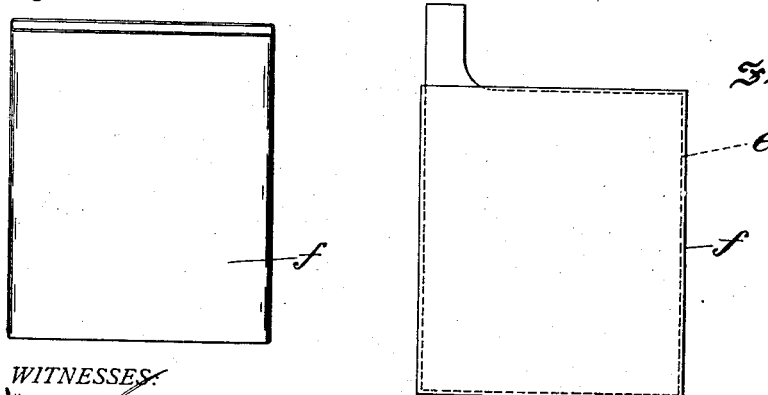
INVENTOR.
Hugh Rodman
BY
Augustus B. Stoughton
ATTORNEY.
WITNESSES:
Frank E. French No. 782,989. Patented February 21, 1905.

UNITED STATES PATENT OFFICE.

HUGH RODMAN, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

ELECTROLYTIC PRODUCTION OF SUPEROXIDS IN ALKALINE SOLUTIONS.

SPECIFICATION forming part of Letters Patent No. 782,989, dated February 21, 1905.

Application filed May 17, 1902. Serial No. 107,792.

*To all whom it may concern:*

Be it known that I, HUGH RODMAN, a citizen of the United States, residing at Philadelphia, in the county of Philadelphia and State of Pennsylvania, have invented certain new and useful Improvements in the Electrolytic Production of Superoxids in Alkaline Solutions, of which the following is a specification.

In the accompanying drawings, which illustrate apparatus that can be employed for practicing the invention, Figure 1 is a top or plan view illustrating a tank, plates, and dynamo. Fig. 2 is a similar view showing the anodes enveloped in fibrous material, and Figs. 3 and 4 are respectively a side view illustrating an envelop applied to the anode and a perspective view of the envelop.

Superoxids of certain of the metals—for example, nickel—have been suggested for use as active material for storage batteries; and it is the object of the present invention to provide for the production of such superoxids direct from the metals.

To this and other ends hereinafter set forth the invention, stated in general terms, comprises the production of such superoxids direct from the metals instead of from intermediate compounds.

In practicing the invention the metal, as nickel, is constituted the anode and use is made of a suitable cathode, as iron. Under ordinary conditions the nickel would be passive in an ordinary alkaline solution; but by my invention I provide an alkaline solution in which the nickel is converted into superoxid. This I may do by employing a very dilute or attenuated alkaline solution as an electrolyte, and this solution may contain an acid radical. Of course acid or a salt containing the radical may be added. As examples of such substances I may mention inorganic salts or acids, as sodium perchlorate, sodium nitrate, &c., also organic salts or acids, as acetic, tartaric, and oxalic acids, &c., and sodium salicylate, &c. An example of an attenuated electrolyte suitable for the practice of the invention would be a one-half-per-cent. solution of caustic potash. The attenuated alkaline solution referred to in the claims is one containing from a trace to one per cent. of concentrated alkali. A like solution of caustic potash containing one-tenth of one per cent. of sodium perchlorate is an example of the second kind of electrolyte to which reference has been made and which is suitable for the practice of the invention. A current of about one-half ampere to a square inch of anode-surface, more or less, is appropriate. The temperature of the bath may be less than 100° Fahrenheit.

In the foregoing description reference has been made to the use of an attenuated solution as an electrolyte. However, that portion of the electrolyte which is adjacent the anode and is active in the reaction can be attenuated, while the balance of the solution is of ordinary strength, and this can be accomplished by placing fibrous material, as blotting-paper, adjacent the anode, the function of the blotting-paper being like that of a diaphragm and permitting the portion of the solution nearest the anode to become dilute by the electrolytic action.

The superoxid is recovered either as a skin on the anode or as a mass in the bottom of the cell, due to the falling off of this skin.

In the drawings, *a* is a tank or vessel which contains the described electrolyte. *b* represents the anodes, and *c* represents the cathodes, and these are connected with the opposite poles of a source of current, as *d*. In Fig. 2 the anodes *e* are shown as enveloped with fibrous material *f*, as blotting-paper.

It will be obvious to those skilled in the art to which the invention relates that modifications may be made in details without departing from the spirit thereof. Hence I do not limit myself to the precise mode of procedure set forth herein; but,

Having thus described the nature and objects of the invention, what I claim as new, and desire to secure by Letters Patent, is—

1. The method of electrolytically producing a superoxid direct from metals which consists in constituting them the anode in an attenuated alkaline solution, substantially as described.

2. The method of electrolytically producing a superoxid direct from metallic nickel which consists in constituting metallic nickel the anode in an attenuated alkaline solution, substantially as described.

3. The method of electrolytically producing a superoxid direct from metals which consists in inclosing them in a diaphragm and constituting the same the anode in an alkaline electrolyte, substantially as described.

4. The method of electrolytically producing a superoxid direct from nickel which consists in inclosing it in a diaphragm and constituting the same the anode in an alkaline electrolyte, substantially as described.

5. The method of electrolytically producing superoxids direct from metals which consists in constituting them the anodes in an attenuated alkaline electrolyte containing an acid radical, substantially as described.

In testimony whereof I have hereunto signed my name.

HUGH RODMAN.

In presence of—
   BRUCE FORD,
   GEO. M. HOWARD.